(12) United States Patent
Sazawa et al.

(10) Patent No.: US 10,731,529 B2
(45) Date of Patent: Aug. 4, 2020

(54) OIL SEPARATOR

(71) Applicant: TOYOTA BOSHOKU KABUSHIKI KAISHA, Aichi-ken (JP)

(72) Inventors: Makoto Sazawa, Kariya (JP); Naritsune Miyanaga, Toyota (JP)

(73) Assignee: TOYOTA BOSHOKU KABUSHIKI KAISHA, Aichi-ken (JP)

(*) Notice: Subject to any disclaimer, the term of this patent is extended or adjusted under 35 U.S.C. 154(b) by 3 days.

(21) Appl. No.: 16/266,551

(22) Filed: Feb. 4, 2019

(65) Prior Publication Data
US 2019/0249579 A1   Aug. 15, 2019

(30) Foreign Application Priority Data

Feb. 9, 2018   (JP) .................. 2018-022034

(51) Int. Cl.
*F01M 13/04*   (2006.01)
*B01D 45/08*   (2006.01)

(52) U.S. Cl.
CPC .............. *F01M 13/04* (2013.01); *B01D 45/08* (2013.01); *F01M 2013/0433* (2013.01); *F01M 2013/0461* (2013.01)

(58) Field of Classification Search
CPC .......... F01M 16/04; F01M 2013/0433; F01M 2013/0461; B01D 45/08
USPC ................................. 123/572, 573
See application file for complete search history.

(56) References Cited

U.S. PATENT DOCUMENTS

| | | | | |
|---|---|---|---|---|
| 8,061,336 B2* | 11/2011 | Takeuchi | ............. | F01M 13/022 |
| | | | | 123/572 |
| 8,794,221 B2* | 8/2014 | Kobayashi | ......... | F01M 13/0416 |
| | | | | 123/572 |
| 2006/0254566 A1* | 11/2006 | Yasuhara | ............. | F01M 13/022 |
| | | | | 123/572 |

FOREIGN PATENT DOCUMENTS

JP   2006-070766   3/2006

* cited by examiner

*Primary Examiner* — Syed O Hasan
(74) *Attorney, Agent, or Firm* — Greenblum & Bernstein, P.L.C.

(57) ABSTRACT

An oil separator includes a case that has an inflow port, an outflow port, and an oil separation portion. The case has a first wall portion and a second wall portion that constitute a flow channel, and a partition wall portion that connects the first wall portion and the second wall portion. The partition wall portion partitions the flow channel into an upstream-side flow channel and a downstream-side flow channel. The oil separation portion has a constriction hole and a step portion. The step portion has a collision face located on the axis of the constriction hole and configured such that blow-by gas that passes through the constriction hole collides against the collision face, and allows oil that collects on the step portion to be discharged into the upstream-side flow channel through the constriction hole.

3 Claims, 6 Drawing Sheets

OIL SEPARATOR

BACKGROUND

The present invention relates to an oil separator that separates oil contained in blow-by gas of an internal combustion engine.

An oil separator that is attachable to a side face of a cylinder block, for example, is known as this kind of oil separator (for example, see Japanese Laid-Open Patent Publication No. 2006-70766). The oil separator disclosed in the aforementioned document includes a case that is attachable to a side face of a cylinder block, and a partition plate that is provided in a protruding manner from a side wall of the case and vertically partitions the space inside the case. The oil separator also includes an introduction passage provided in the bottom wall of the case, and a discharge passage provided in an upper portion of a side wall of the case. The introduction passage introduces blow-by gas from inside a crankcase into the case. The discharge passage discharges blow-by gas from inside the case to an intake passage. The partition plate has an inclined wall portion and a suspended wall portion. The inclined wall portion extends from a side wall of the case and inclines with respect to the horizontal direction so as to be located progressively downward in the direction away from the side wall. The suspended wall portion extends in the downward direction from the distal end of the inclined portion. A constriction passage for increasing the flow velocity of blow-by gas is provided in a vertically extending manner through the inclined wall portion of the partition plate. Further, in an upper portion of the partition plate inside the case, a collision plate is provided that extends from a side wall of the case and against which blow-by gas that has passed through the constriction passage collides.

In the aforementioned oil separator, blow-by gas is introduced into the case through the introduction passage, and passes through the constriction passage and flows in the upward direction. Oil mist contained in the blow-by gas collides with and collects on the collision plate, and is thereby separated from the blow-by gas. Further, the oil that has collected on the collision plate drips onto the inclined wall portion under its own weight, and passes through a gap between the suspended wall portion and a wall portion of the case and flows downward onto the bottom wall of the case. The oil that has flowed downward in this manner is discharged to the outside of the case from the introduction passage.

In the oil separator disclosed in the aforementioned document, in order to discharge oil that has been separated by means of the collision plate to the outside of the case, the partition plate having the inclined wall portion and the suspended wall portion is provided. Consequently, there are disadvantages in that the structure of the oil separator is complicated by the presence of such a partition plate and collision plate, and the size of the oil separator is large.

SUMMARY

An objective of the present invention is to provide an oil separator that, by means of a simple structure, can separate oil contained in blow-by gas.

To achieve the foregoing objective, an oil separator is provided that includes a case and an oil separation portion. The case has an inflow port and an outflow port and includes therein a flow channel configured such that blow-by gas flows from the inflow port toward the outflow port. The oil separation portion is provided inside the case and is configured so as to separate oil contained in the blow-by gas from the blow-by gas. The oil separator is configured so as to discharge oil that is separated by the oil separation portion through the inflow port. The case includes a first wall portion, a second wall portion, and a partition wall portion. The first wall portion and a second wall portion face each other and constitute the flow channel. The partition wall portion connects the first wall portion and the second wall portion to each other and partitions the flow channel into an upstream-side flow channel that is located on an upstream side in a flow direction of blow-by gas and a downstream-side flow channel that is located on a downstream side in the flow direction. The oil separation portion includes a constriction hole that extends through the partition wall portion, and a step portion that constitutes a part of the first wall portion. The step portion has a collision face that is located on an axis of the constriction hole and is configured such that blow-by gas that has passed through the constriction hole collides with the collision face. The step portion allows oil that collects on the step portion to be discharged to the upstream-side flow channel through the constriction hole.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferable embodiments together with the accompanying drawings in which.

DETAILED DESCRIPTION

Figure 1:
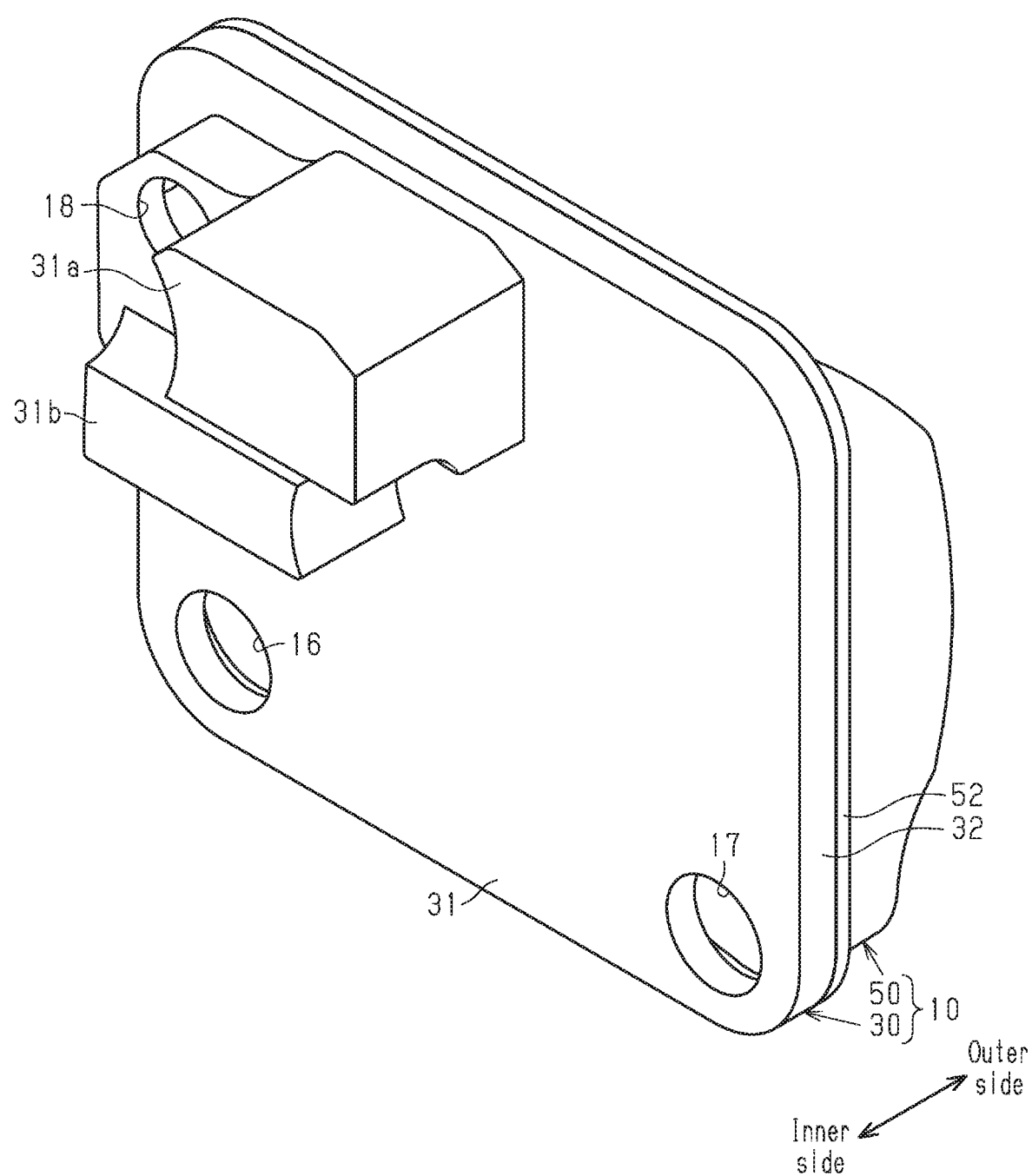
FIG. 1 is a perspective view showing the overall shape of an oil separator according to an embodiment.

Hereunder, an oil separator according to an embodiment will be described with reference to FIGS. 1 to 7.

The oil separator of the present embodiment is attached to a side face of the cylinder block forming the engine body of an internal combustion engine, and subjects oil contained in blow-by gas to gas-liquid separation, and is provided in the middle of a recirculation passage (not illustrated in the drawings) that recirculates blow-by gas to the intake passage (not illustrated in the drawings).

As illustrated in FIG. 1, the oil separator of the present embodiment includes a case 10 that is attachable to a side face of the cylinder block (not illustrated in the drawings).

The case 10 is constituted by an inner case 30 that is attachable to the side face of the cylinder block and an outer case 50. The outer case 50 is provided on the opposite side of the inner case 30 from the cylinder block and is joined to the inner case 30. Although not illustrated in the drawings, the inner case 30 has insertion holes through which bolts that attach the inner case 30 to the cylinder block are inserted in a peripheral edge portion. The inner case 30 and the outer case 50 are each formed of a hard plastic.

Hereinafter, the direction in which the case 10 faces the side face of the cylinder block will be referred to as a facing direction, and the direction that is orthogonal to both the vertical direction and the facing direction will be referred to as a width direction. Further, among the sides that face in the facing direction, a side that is closer to the cylinder block will be referred to as an inner side, and a side that is away from the cylinder block will be referred to as an outer side.

First, the inner case 30 will be described.

Figure 2:
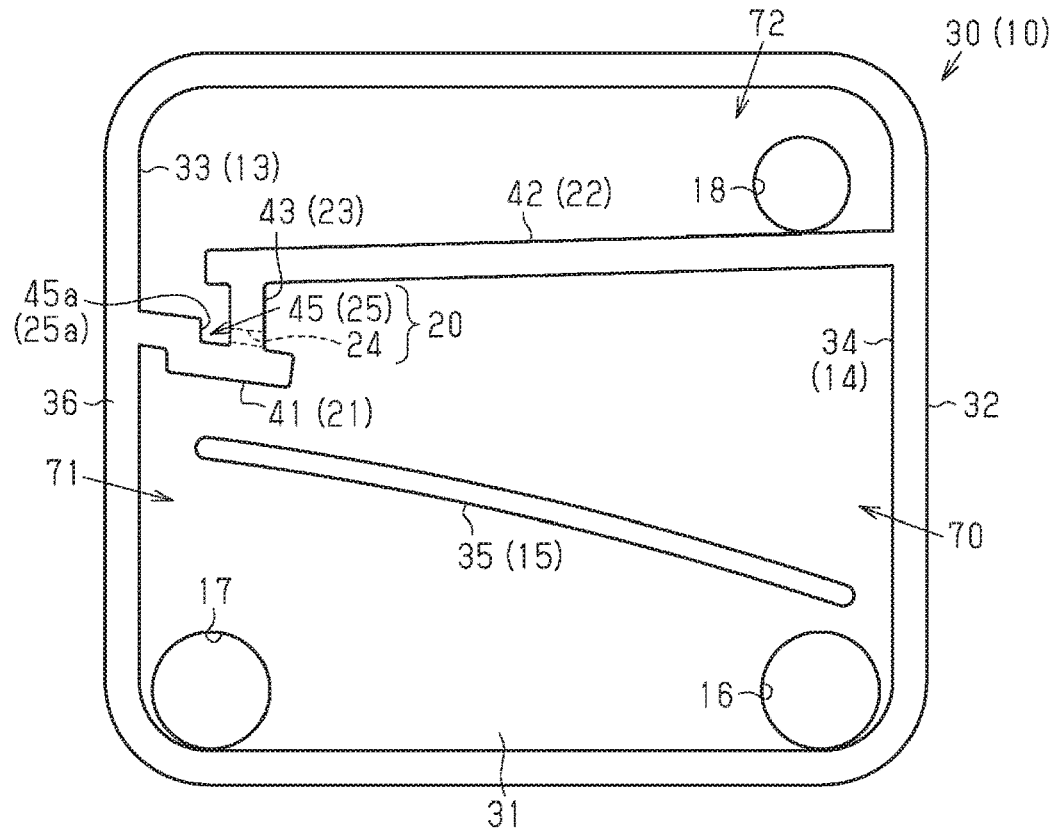
FIG. 2 is a side view showing the internal structure of an inner case of the embodiment shown in FIG. 1.
Figure 3:
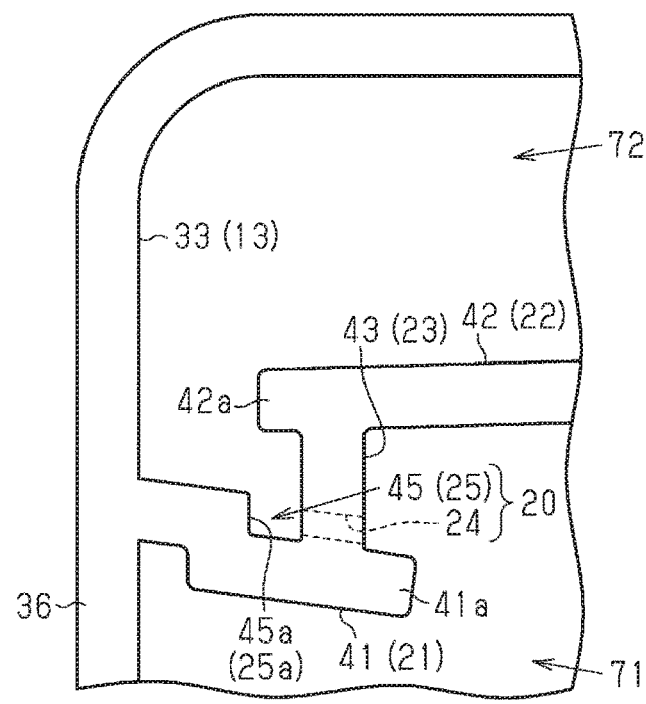
FIG. 3 is an enlarged side view of the embodiment shown in FIG. 1, mainly showing a step portion of the inner case.

As illustrated in FIGS. 1 to 3, the inner case 30 has a substantially rectangular shape in a side view. The inner case 30 has an inner-side facing wall 31 that faces a side face of the cylinder block, and a peripheral wall 32 that protrudes outward from the entire peripheral edge of the inner-side facing wall 31.

As illustrated in FIGS. 2 and 3, the peripheral wall 32 has a first side wall 33 and a second side wall 34 that face each other in the width direction.

As illustrated in FIGS. 1 and 2, a first inflow port 16 and a second inflow port 17 into which blow-by gas from inside the cylinder block flows are provided in a lower part of the inner-side facing wall 31 with a space therebetween in the width direction (lateral direction in FIG. 2). Further, an outflow port 18 from which blow-by gas flows out toward the downstream side of the recirculation passage is provided in an upper part of the inner-side facing wall 31. The outflow port 18 is provided closer to the second side wall 34 than to the first side wall 33 of the peripheral wall 32. In the present embodiment, the outflow port 18 is provided on the same side (right side in FIG. 2) as the first inflow port 16 in the width direction.

<First Wall Portion 41>

As illustrated in FIGS. 2 and 3, a first wall portion 41 is provided in a protruding manner toward the second side wall 34 from the inner face of the first side wall 33. The first wall portion 41 is connected to the inner face of the inner-side facing wall 31 over the entire area in the protruding direction thereof. A distal end 41a in the protruding direction of the first wall portion 41 is closer to the first side wall 33 than to the second side wall 34 (see FIG. 2). The entire first wall portion 41 inclines so as to be located progressively downward toward the distal side in the protruding direction of the first wall portion 41. Further, a step portion 45 shaped in the form of a downward step toward the distal side (right side in FIGS. 2 and 3) of the first wall portion 41 is provided at an intermediate portion in the protruding direction of the first wall portion 41. With respect to the top face of the first wall portion 41, a portion thereof that is on the base end side (left side in FIGS. 2 and 3) relative to the step portion 45, and a portion thereof that is on the distal side relative to the step portion 45 are parallel.

<Second Wall Portion 42>

As illustrated in FIGS. 2 and 3, a second wall portion 42 is provided in a protruding manner toward the first side wall 33 from the inner face of the second side wall 34. The second wall portion 42 is connected to the inner face of the inner-side facing wall 31 over the entire area in the protruding direction thereof. The second wall portion 42 is located above the first wall portion 41. A distal end 42a in the protruding direction of the second wall portion 42 is located directly above the step portion 45 of the first wall portion 41. The entire second wall portion 42 inclines so as to be located progressively downward toward the distal side in the protruding direction of the second wall portion 42.

<Partition Wall Portion 43>

A portion that is between the distal end 41a and the step portion 45 on the top face of the first wall portion 41, and the undersurface of the second wall portion 42 are connected by a partition wall portion 43 that extends in the vertical direction. The partition wall portion 43 is connected to the inner face of the inner-side facing wall 31 over the entire area thereof in the extending direction (vertical direction).

Figure 7:
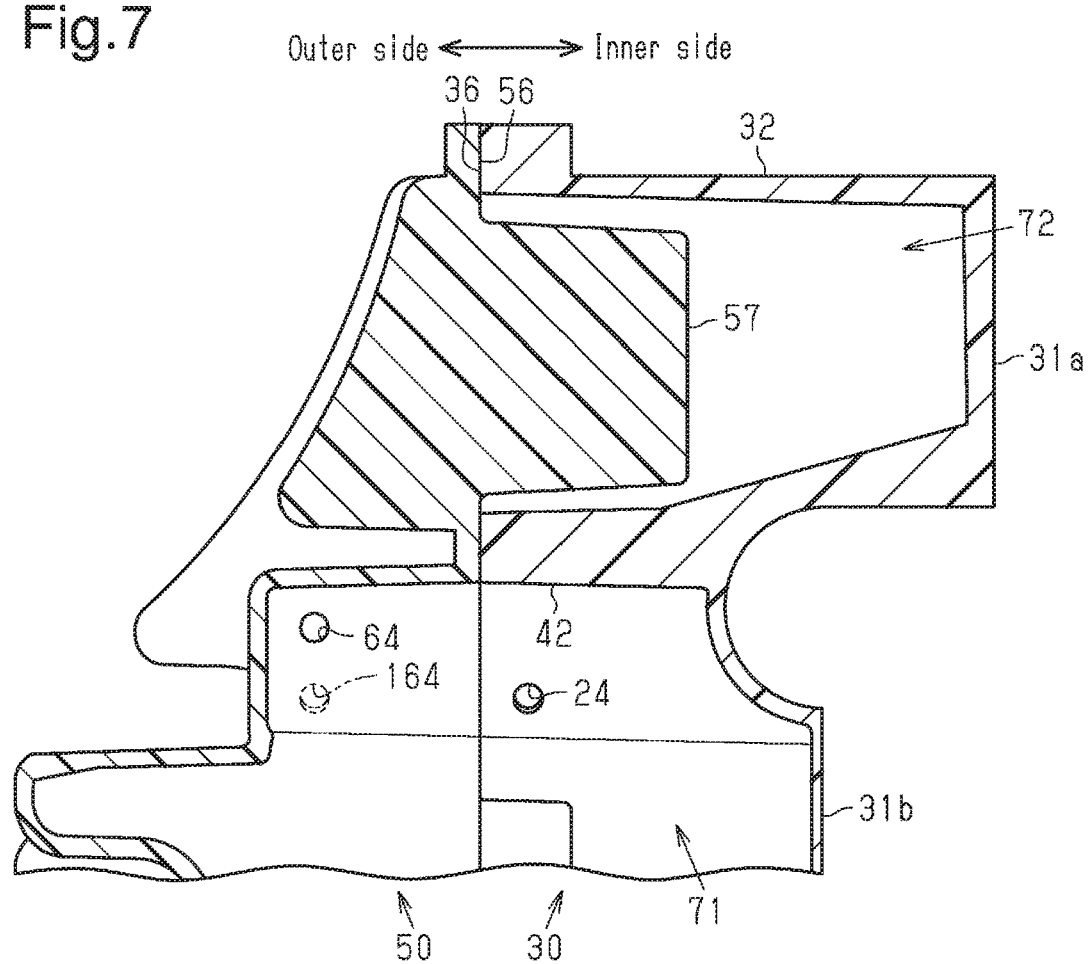
FIG. 7 is a cross-sectional view of the case taken along line 7-7 in FIG. 6.

As illustrated in FIGS. 2, 3 and 7, in the lower part of the partition wall portion 43, a constriction hole 24 is provided that extends through the partition wall portion 43 in the thickness direction thereof. The constriction hole 24 is provided in a portion on the outer side of the partition wall portion 43 (see FIG. 7). The constriction hole 24 has a circular cross-sectional shape, and extends along the top face of the first wall portion 41. A collision face 45a that is a side face of the step portion 45 is located on the axis of the constriction hole 24.

A shielding plate portion 35 is provided in a protruding manner in a lower part of the inner-side facing wall 31. The shielding plate portion 35 shields the flow of blow-by gas that passes between the distal end 41a of the first wall portion 41 and the peripheral wall 32 that faces the distal end 41a in the width direction. The shielding plate portion 35 is located between the respective inflow ports 16, 17 and the first wall portion 41 in the vertical direction. The shielding plate portion 35 inclines so as to be located progressively downward in the direction away from the first side wall 33 with respect to the width direction.

The respective end faces on the outer side of the peripheral wall 32, the first wall portion 41, the second wall portion 42, and the partition wall portion 43 of the inner case 30 constitute a joining face 36 to which the outer case 50 that is described below is joined.

As illustrated in FIG. 1, a first protrusion 31a and a second protrusion 31b that protrude toward the inner side are provided in the upper part of the inner-side facing wall 31. As illustrated in FIGS. 1 and 2, the first protrusion 31a and the second protrusion 31b are positioned so as to be vertically adjacent to each other with the second wall portion 42 in between.

Next, the outer case 50 will be described.

Figure 4:
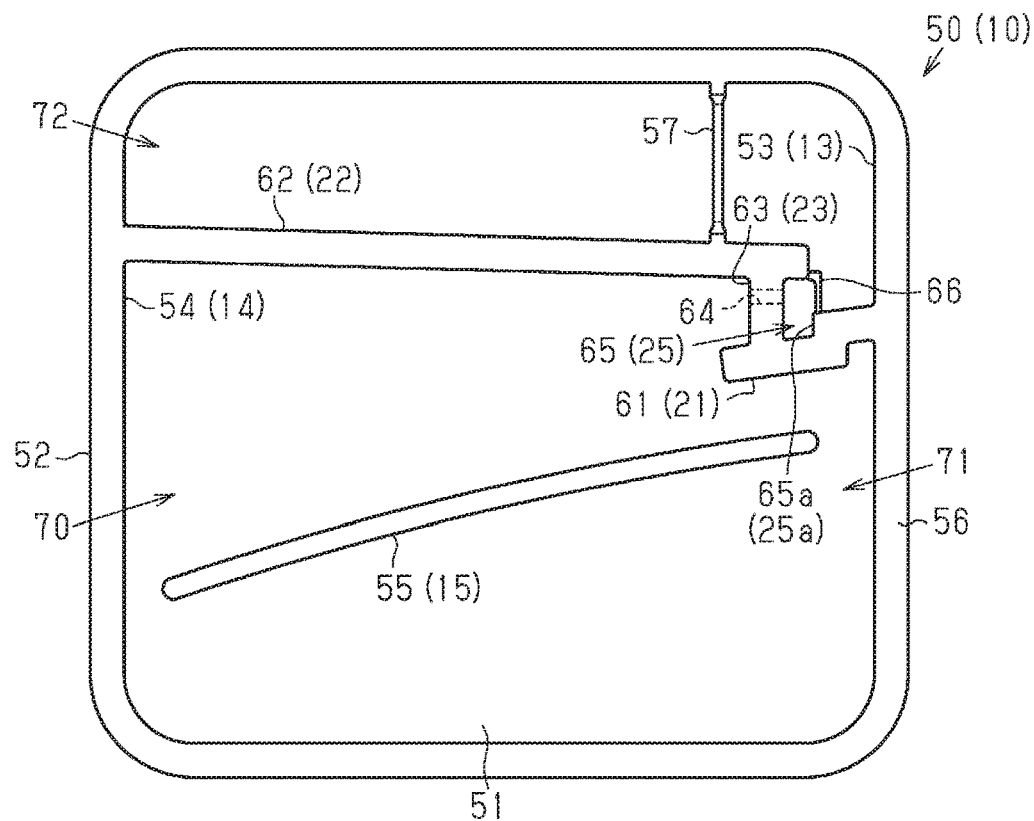
FIG. 4 is a side view showing the internal structure of an outer case of the embodiment shown in FIG. 1.
Figure 5:
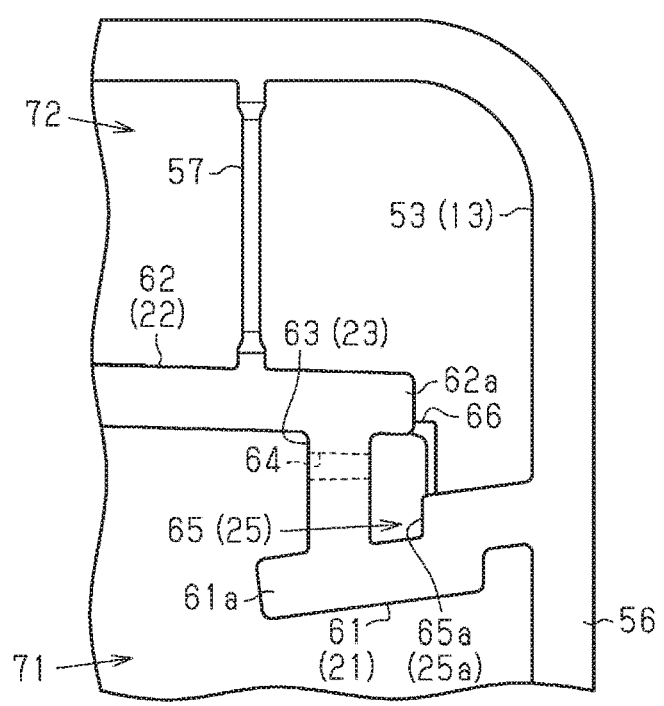
FIG. 5 is an enlarged side view of the embodiment shown in FIG. 1, mainly showing a step portion of the outer case.

As illustrated in FIGS. 4 and 5, the outer case 50 has a substantially rectangular shape in a side view, and has an outer-side facing wall 51 that faces the inner-side facing wall 31 of the inner case 30, and a peripheral wall 52 that protrudes inward from the entire peripheral edge of the outer-side facing wall 51.

The peripheral wall 52 has a first side wall 53 and a second side wall 54 that face each other in the width direction.

Figure 6:
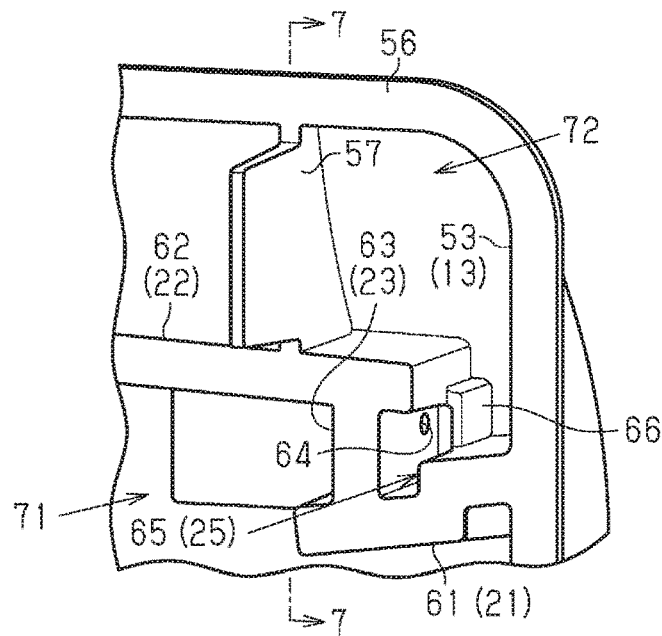
FIG. 6 is an enlarged perspective view of the embodiment shown in FIG. 1, mainly showing the step portion of the outer case.

As illustrated in FIGS. 4 to 6, the internal structure of the outer case 50 has a shape that corresponds to the internal structure of the inner case 30. Therefore, hereunder, respective components of the outer case 50 that correspond to respective components of the inner case 30 are denoted by reference numerals 5* and 6* obtained by adding 20 to the reference numerals 3* and 4*, which denote the corresponding components of the inner case 30, and a redundant description will be omitted in some cases.

<First Wall Portion 61>

As illustrated in FIGS. 4 to 6, a first wall portion 61 is provided in a protruding manner from an inner face of the first side wall 53. The first wall portion 61 is connected to the inner face of the outer-side facing wall 51 over the entire area in the protruding direction thereof.

<Second Wall Portion 62>

As illustrated in FIGS. 4 to 6, a second wall portion 62 is provided in a protruding manner toward the first side wall 53 from the inner face of the second side wall 54. The second wall portion 62 is connected to the inner face of the outer-side facing wall 51 over the entire area in the protruding direction thereof.

<Partition Wall Portion 63>

As illustrated in FIGS. 4 to 6, the first wall portion 61 and the undersurface of the second wall portion 62 are connected by a partition wall portion 63 that extends in the vertical direction. The partition wall portion 63 is connected to the inner face of the outer-side facing wall 51 over the entire area in the extending direction (vertical direction) thereof.

As illustrated in FIGS. 4 to 7, in an upper part of the partition wall portion 63, a through-hole 64 is provided that extends through the partition wall portion 63 in the thickness direction thereof. The through-hole 64 is provided in a portion on the outer side of the partition wall portion 63 (see FIGS. 6 and 7). The through-hole 64 has a circular cross-sectional shape, and extends along the top face of the first wall portion 61.

A step portion 65 and a distal end 62a of the second wall portion 62 are connected by a connecting wall 66 that extends in the vertical direction. The connecting wall 66 is connected to the inner face of the outer-side facing wall 51 over the entire area in the extending direction thereof. The connecting wall 66 protrudes from the inner face of the outer-side facing wall 51 to a central part of the first wall portion 61 in the facing direction. Therefore, the connecting wall 66 is located on the axis of the through-hole 64.

A shielding plate portion 55 is provided in a protruding manner in a lower part of the outer-side facing wall 51.

A shielding plate portion 57 is provided in a protruding manner in an upper part of the outer-side facing wall 51. The shielding plate portion 57 connects the top face of the second wall portion 62 and the inner face of the peripheral wall 52 that faces the aforementioned top face.

As illustrated in FIG. 7, the shielding plate portion 57 protrudes toward the inside of the first protrusion 31a of the inner case 30. A gap is provided between the top edge of the shielding plate portion 57 and the inner face of the peripheral wall 32 of the inner case 30. Further, a gap is provided between the bottom edge of the shielding plate portion 57 and the top face of the second wall portion 42 of the inner case 30.

The respective end faces on the inner side of the peripheral wall 52, the first wall portion 61, the second wall portion 62, and the partition wall portion 63 of the outer case 50 constitute a joining face 56 to which the joining face 36 of the inner case 30 is joined. According to the present embodiment, the joining face 36 of the inner case 30 and the joining face 56 of the outer case 50 are joined.

Therefore, in the present embodiment, a first side wall 13 of the case 10 is constituted by the first side wall 33 of the inner case 30 and the first side wall 53 of the outer case 50. Further, a second side wall 14 of the case 10 is constituted by the second side wall 34 of the inner case 30 and the second side wall 54 of the outer case 50. A shielding plate portion 15 of the case 10 is constituted by the shielding plate portion 35 of the inner case 30 and the shielding plate portion 55 of the outer case 50. Further, a first wall portion 21 of the case 10 is constituted by the first wall portion 41 of the inner case 30 and the first wall portion 61 of the outer case 50. A second wall portion 22 of the case 10 is constituted by the second wall portion 42 of the inner case 30 and the second wall portion 62 of the outer case 50. A partition wall portion 23 of the case 10 is constituted by the partition wall portion 43 of the inner case 30 and the partition wall portion 63 of the outer case 50. Further, a step portion 25 of the case 10 is constituted by the step portion 45 of the inner case 30 and the step portion 65 of the outer case 50. A collision face 25a of the case 10 is constituted by the collision face 45a of the step portion 45 of the inner case 30 and a collision face 65a of the step portion 65 of the outer case 50.

Inside the case 10, a flow channel 70 is formed along which blow-by gas flows toward the outflow port 18 from the respective inflow ports 16 and 17. A part of the flow channel 70 is formed by the first wall portion 21 and the second wall portion 22. Further, the flow channel 70 is partitioned by the partition wall portion 23 into an upstream-side flow channel 71 that is the upstream side in the flow direction of blow-by gas and a downstream-side flow channel 72 that is the downstream side in the flow direction. The upstream-side flow channel 71 and the downstream-side flow channel 72 of the flow channel 70 communicate only through the constriction hole 24 and the through-hole 64.

In the present embodiment, an oil separation portion 20 is constituted by the constriction hole 24 and the step portion 25.

An operation of the present embodiment will now be described.

The oil separator of the present embodiment is attached to the side face of the cylinder block. Therefore, in addition to blow-by gas, oil in liquid form that is sloshed by rotation of the crankshaft inside the crankcase flows into the case 10 from the inflow ports 16 and 17.

The shielding plate portion 15, the first wall portion 21, and the second wall portion 22 are provided in the upstream-side flow channel 71 of the oil mist separator. Therefore, oil in liquid form that flows into the case 10 or oil mist contained in blow-by gas collides against and collects on the undersurface of the shielding plate portion 15, the undersurface of the first wall portion 21, or the undersurface of the second wall portion 22 (hereunder, referred to as an operation 1). The collected oil drops down under its own weight and is discharged into the cylinder block through the inflow ports 16 and 17.

In contrast, with respect to blow-by gas that flows into the case 10 from the inflow ports 16 and 17, the blow-by gas that has passed between the shielding plate portion 15 and the first wall portion 21 and the blow-by gas that has passed between the shielding plate portion 15 and the second side wall 14 each collide with the partition wall portion 23 and thus oil mist collects on it. The oil that has collected on the partition wall portion 23 drops down under its own weight and is discharged into the cylinder block through the inflow ports 16 and 17.

In contrast, blow-by gas that has passed through the constriction hole 24 without colliding with the partition wall portion 23 collides against the collision face 25a of the step portion 25. Further, blow-by gas that has passed through the through-hole 64 collides against the connecting wall 66. Since the passage cross-sectional area of the constriction hole 24 and the passage cross-sectional area of the through-hole 64 are smaller than the passage cross-sectional area of the upstream-side flow channel 71, the flow velocity of the blow-by gas is increased by passing through the constriction hole 24 and the through-hole 64. Thereby, the inertial force of the blow-by gas is increased, allowing oil mist contained in the blow-by gas to readily collect on the collision face 25a and the connecting wall 66. In this way, the oil mist is separated from the blow-by gas. Further, directly above the base end portion of the first wall portion 21, the flow direction of the blow-by gas is abruptly changed by the first side wall 13. Therefore, oil mist contained in the blow-by gas collects on the inner face of the first side wall 13, thereby separating the oil mist from the blow-by gas. The oil that is separated from the blow-by gas in this way is accumulated between the step portion 25 and the partition wall portion 23. When the engine operation stops and blow-by gas no longer flows along the flow channel 70, the oil that has been accumulated in this way passes through the constriction hole 24 and is discharged into the upstream-side flow channel 71, and is discharged into the cylinder block from the respective inflow ports 16 and 17 (hereunder, referred to as an operation 2).

The oil separator according to the present embodiment has the following advantages.

(1) The oil separation portion 20 has the constriction hole 24 that extends through the partition wall portion 23, and the step portion 25 that constitutes a part of the first wall portion 21. The step portion 25 has the collision face 25a, which is located on the axis of the constriction hole 24 and against which blow-by gas that has passed through the constriction hole 24 collides, and allows oil that has collected on the step portion 25 to be discharged into the upstream-side flow channel 71 through the constriction hole 24.

According to this configuration, since the aforementioned operation 2 is performed, the configuration of the oil separator can be simplified in comparison to a configuration in which a dedicated discharge hole for discharging oil is provided separately from the constriction hole 24.

(2) In the partition wall portion 23, the through-hole 64, which is different from the constriction hole 24, is provided.

According to this configuration, even in a case where the passage cross-sectional area of the constriction hole 24 decreases due to oil sticking to the constriction hole 24 or the like, a communication state between the upstream-side flow channel 71 and the downstream-side flow channel 72 is ensured by the through-hole 64. This reduces the occurrence of a situation in which it is difficult for blow-by gas to flow or it is difficult for oil to be discharged.

(3) The case 10 is configured so as to be attachable to a side face of a cylinder block. Therefore, the oil separator can be provided even in a case where it is difficult to provide the oil separator on a cylinder head cover due to mounting constraints.

(4) The outflow port 18 is located above the inflow ports 16 and 17. The case 10 includes the first side wall 13, and the second side wall 14, which faces the first side wall 13. The first wall portion 21 protrudes toward the second side wall 14 from the inner face of the first side wall 13 of the case 10. The second wall portion 22 protrudes toward the first side wall 13 from the inner face of the second side wall 14 of the case 10, and is also located above the first wall portion 21. The partition wall portion 23 extends in the vertical direction. The constriction hole 24 is provided in a lower part of the partition wall portion 23. The collision face 25a is constituted by a side face of the step portion 25.

According to this configuration, blow-by gas flows into the case 10 from the inflow ports 16 and 17, flows between the first wall portion 21 and the second wall portion 22, passes through the constriction hole 24 of the partition wall portion 23, and collides with the collision face 25a constituted by the side face of the step portion 25 of the first wall portion 21.

Since the constriction hole 24 is provided in the lower part of the partition wall portion 23, even if the amount of oil that is accumulated between the step portion 25 and the partition wall portion 23 or the like is small, the accumulated oil is discharged into the upstream-side flow channel 71 through the constriction hole 24. Accordingly, oil that has been separated from blow-by gas is discharged at an early stage.

(5) The first wall portion 21 inclines so as to be located progressively downward toward the distal side in the protruding direction of the first wall portion 21 from the first side wall 13.

According to this configuration, oil that is accumulated on the step portion 25 moves towards the distal side of the first wall portion 21 under its own weight, and the discharge of oil through the constriction hole 24 is thus facilitated. Accordingly, the oil discharging performance is improved.

(6) The shielding plate portion 15 is provided between the inflow ports 16 and 17 and the first wall portion 21 in the vertical direction.

According to this configuration, since the aforementioned operation 1 is performed, the oil separation performance is improved. This reduces the occurrence of a situation in which the constriction hole 24 is blocked by oil.

(7) The oil separator includes the shielding plate portion 57, which is located between the oil separation portion 20 and the outflow port 18.

According to this configuration, blow-by gas that passed through the oil separation portion 20 collides against the shielding plate portion 57. Therefore, oil that remains in the blow-by gas that passed through the oil separation portion 20 is further separated therefrom. Accordingly, the oil separation performance is further improved.

The present embodiment may be modified as follows. The above-described embodiments and the following modifications can be combined as long as the combined modifications remain technically consistent with each other.

A plurality of shielding plate portions 57 can also be provided in the downstream-side flow channel 72. Further, a shielding plate portion that protrudes from the inner case 30 toward the outer case 50 may be provided in addition to or in place of the shielding plate portion 57.

The shielding plate portion 57 of the downstream-side flow channel 72 can be omitted.

A plurality of shielding plate portions 15 can be provided in the upstream-side flow channel 71.

The first wall portion 21 is not limited to a wall portion that inclines so as to be located progressively downward toward the distal side in the protruding direction of the first wall portion 21 from the first side wall 13. For example, the first wall portion 21 may be a wall portion that extends along the horizontal direction.

The constriction hole may be provided so that the lowermost part of the inner peripheral surface of the constriction hole 24 corresponds to, in the vertical direction, a portion of the top face of the first wall portion 41 that is further to the distal side than the step portion 45. In this case, the oil discharging performance can be further improved.

A plurality of constriction holes 24 can be provided in the facing direction (lateral direction in FIG. 7) of the case 10.

The respective shapes of the constriction hole 24 and the through-hole 64 can be changed as necessary. For example, the constriction hole 24 and the through-hole 64 may each be constituted by a stepped hole that has a stepped portion on the upstream side. The constriction hole 24 and the through-hole 64 may also be formed in a tapered shape in which the cross-sectional area is reduced progressively toward the downstream side.

Although the oil separator having the two inflow ports 16 and 17 is described by way of example in the above embodiment, the number of inflow ports may be one or may be three or more.

The collision face 25a does not necessarily need to be a flat face, and for example, may be a face that has uneven portions. In this case, the surface area of the collision face 25a against which blow-by gas collides increases, and the oil separation performance improves.

Another oil separator can also be provided on the downstream side of the oil separator according to the present invention in the recirculation passage.

Figure 8:
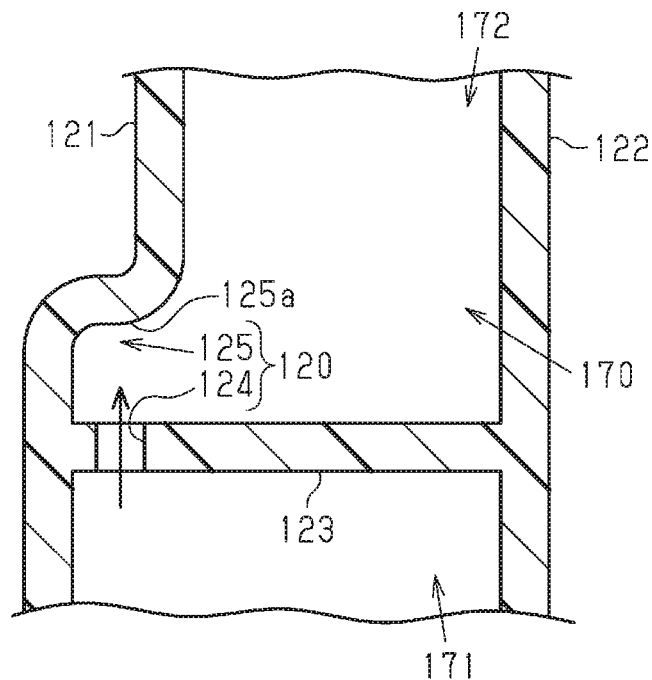
FIG. 8 is an enlarged cross-sectional view showing an oil separator according to a first modification, mainly showing an oil separation portion.

As illustrated in FIG. 8, a first wall portion 121 and a second wall portion 122 may be wall portions that each extend in the vertical direction. In this case, a partition wall portion 123 connects the first wall portion 121 and the second wall portion 122 and also partitions a vertically extending flow channel 170 into an upstream-side flow channel 171 and a downstream-side flow channel 172. Further, it suffices to provide a constriction hole 124 in a portion of the partition wall portion 123 that is close to the first wall portion 121, and to provide a step portion 125 having a collision face 125a that is located on the axis of the constriction hole 124, at a position that is further on the downstream side than the constriction hole 124 in the first wall portion 121. In this case also, an oil separation portion 120 is constituted by the constriction hole 124 and the step portion 125.

Figure 9:
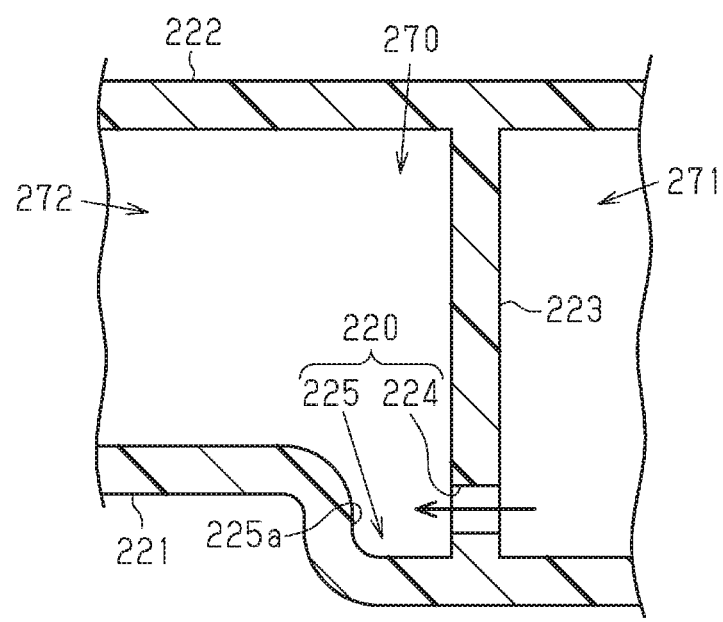
FIG. 9 is an enlarged cross-sectional view showing an oil separator according to a second modification, mainly showing an oil separation portion.

The present invention can also be applied to an oil separator that is provided on a cylinder head cover. That is, as illustrated in FIG. 9, a first wall portion 221 and a second wall portion 222 are provided in a lower part and an upper part, respectively, of a cylinder head cover. The partition wall portion 223 connects the first wall portion 221 and the second wall portion 222 and also partitions a flow channel 270 into an upstream-side flow channel 271 and a downstream-side flow channel 272. Further, it suffices to provide a constriction hole 224 in a lower part of the partition wall portion 223, and to provide a step portion 225 having a collision face 225a that is located on the axis of the constriction hole 124, at a position that is further on the downstream side than the constriction hole 224 in the first wall portion 221. In this case also, an oil separation portion 220 is constituted by the constriction hole 224 and the step portion 225.

Figure 10:
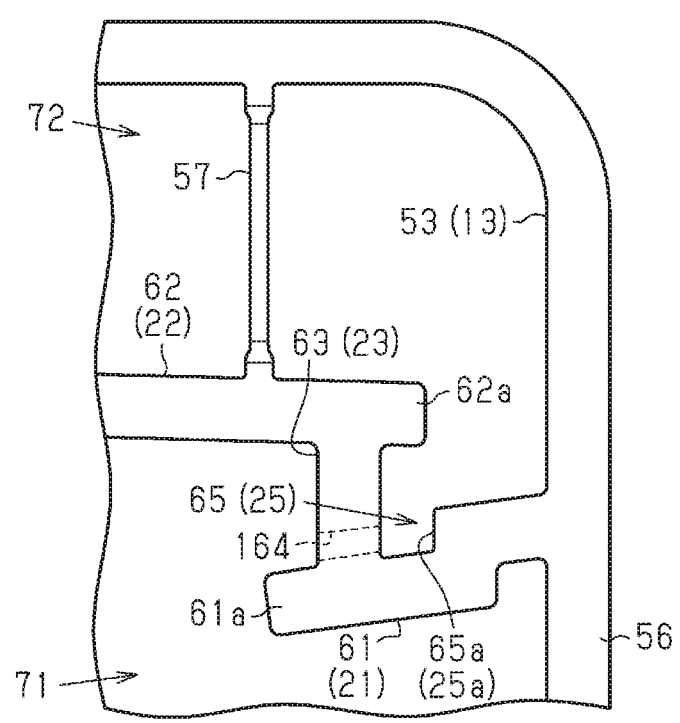
FIG. 10 is an enlarged side view showing an oil separator according to a third modification, mainly showing a step portion of an outer case.

As illustrated in FIG. 10, it is possible to omit the connecting wall 66. In this case, as illustrated in FIG. 7, by providing a constriction hole 164 instead of the through-hole 64 in the lower part of the partition wall portion 63 of the outer case 50, the collision face 65a that is a side face of the step portion 65 will be positioned on the axis of the constriction hole 164 as illustrated in FIG. 10. Therefore, when blow-by gas that passed through the constriction hole 164 collides against the collision face 65a of the step portion 65, oil contained in the blow-by gas will be separated therefrom. Accordingly, the oil separation performance can be further improved.

The invention claimed is:

1. An oil separator comprising: a case that has an inflow port and an outflow port and includes therein a flow channel configured such that blow-by gas flows from the inflow port toward the outflow port; and an oil separation portion that is provided inside the case and is configured so as to separate oil contained in the blow-by gas from the blow-by gas; wherein the oil separator is configured so as to discharge oil that is separated by the oil separation portion through the inflow port, the case includes a first wall portion and a second wall portion that face each other and constitute the flow channel, and a partition wall portion that connects the first wall portion and the second wall portion to each other and partitions the flow channel into an upstream-side flow channel that is located on an upstream side in a flow direction of blow-by gas and a downstream-side flow channel that is located on a downstream side in the flow direction; the oil separation portion includes a constriction hole that extends through the partition wall portion, and a step portion that constitutes a part of the first wall portion, the step portion has a collision face that is located on an axis of the constriction hole and is configured such that blow-by gas that has passed through the constriction hole collides with the collision face, the step portion allows oil that collects on the step portion to be discharged to the upstream-side flow channel through the constriction hole, wherein the case is configured to be attachable to a side face of an engine body, wherein the outflow port is located above the inflow port, the case includes a first side wall, and a second side wall that faces the first side wall, the first wall portion protrudes from an inner face of the first side wall toward the second side wall, the second wall portion protrudes from an inner face of the second side wall toward the first side wall and is located above the first wall portion, the partition wall portion extends in a vertical direction, the constriction hole is provided in a lower part of the partition wall portion, and the collision face is constituted by a side face of the step portion.

2. The oil separator according to claim 1, wherein the first wall portion inclines so as to be located progressively downward toward a distal side in a protruding direction of the first wall portion from the first side wall.

3. The oil separator according to claim 1, further comprising a shielding plate portion that is located between the inflow port and the first wall portion in the vertical direction.

* * * * *